United States Patent [19]

Taft

[11] Patent Number: 5,579,973

[45] Date of Patent: Dec. 3, 1996

[54] CARRIER FOR LIGHTWEIGHT TWO WHEEL VEHICLES, WITH CAPABILITY FOR ALSO TOWING A TRAILER

[76] Inventor: William O. Taft, 4195 S. Tamiami Trail, #402, Venice, Fla. 34293

[21] Appl. No.: 440,478

[22] Filed: May 12, 1995

[51] Int. Cl.[6] ........................................................ B60R 7/00
[52] U.S. Cl. ............................. 224/509; 224/495; 224/497
[58] Field of Search .................................... 224/509, 495, 224/497, 502, 504, 518, 519, 520, 521, 488, 498, 499, 511, 537

[56] References Cited

U.S. PATENT DOCUMENTS

| | | |
|---|---|---|
| D. 331,214 | 11/1992 | Johnson . |
| 2,552,977 | 5/1951 | Klotz . |
| 3,207,396 | 9/1965 | Mundell et al. . |
| 3,720,333 | 3/1973 | Vaughn . |
| 3,744,689 | 7/1973 | Kjensmo . |
| 3,843,001 | 10/1974 | Willis ........................................ 224/518 |
| 3,853,255 | 12/1974 | Spencer .................................... 224/521 |
| 3,912,098 | 10/1975 | Nicotra . |
| 3,993,229 | 11/1976 | Summers . |
| 4,646,952 | 3/1987 | Timmers .................................. 224/518 |
| 4,702,401 | 10/1987 | Graber et al. . |
| 4,815,638 | 3/1989 | Hutyra . |
| 4,875,608 | 10/1989 | Gorber ..................................... 224/497 |
| 5,215,233 | 6/1993 | Baldeck . |
| 5,244,133 | 9/1993 | Abbott et al. . |
| 5,377,886 | 1/1995 | Sickler . |
| 5,445,300 | 8/1995 | Eipper et al. ............................. 224/509 |

Primary Examiner—David J. Walczak
Attorney, Agent, or Firm—Julian C. Renfro, Esq.

[57] ABSTRACT

A carrier for a two wheel vehicle adapted for mounting on the rear of a motor vehicle, with one configuration of this carrier being an extended position intended for carrying a two wheeled vehicle. The second configuration of the carrier is a compacted position in which a minimal amount of space along the rear of the motor vehicle is occupied. This carrier utilizes a rigid base member having a wheel receiving portion, and a second rigid member pivotally attached to the base member, the second member also having a wheel receiving portion. The second member, when in the compacted position, has its wheel receiving position adjacent the wheel receiving portion of the base member, but when the second member is moved to the extended position, its wheel receiving portion is removed for a relatively substantial distance from the wheel receiving portion of the base member. In this way the wheels of a two wheel vehicle can be substantially simultaneously received in the wheel receiving portions of the base member and the second member, whereby the two wheeled vehicle can be transported by the motor vehicle to another location. One embodiment of my carrier may utilize a towing ball that becomes available for towing a trailer when the second member has been moved to its compacted position, whereas in another embodiment the towing ball is at all times in an active position in which the tongue of a trailer can be readily received.

21 Claims, 4 Drawing Sheets

CARRIER FOR LIGHTWEIGHT TWO WHEEL VEHICLES, WITH CAPABILITY FOR ALSO TOWING A TRAILER

FIELD OF THE INVENTION

This invention relates to a vehicle mounted carrier and more particularly to a carrier for transporting motorscooters, mopeds, motorbikes or other relatively light two wheel vehicles on the rear of a motor vehicle.

For many years two wheel vehicles such as mopeds, motorbikes, motorscooters and lightweight motorcycles have been popular recreational items, and this popularity has resulted in the creation of a number of sports involving such vehicles. Unfortunately, it is often necessary to transport these two wheel vehicles to designated areas by the use of a motor vehicle, to locations where activities designed for two wheel vehicles are being conducted. Frequently the participants have to travel relatively long distances that make travel in a recreational vehicle feasible because of the comfort afforded by such vehicles when traveling for lengthy distances. Consequently, it is desirable to provide a compact, easily affordable two wheel vehicle carrier that can be readily mounted, at the user's option, on an automobile, van, recreational vehicle, or other motor vehicle.

BACKGROUND OF THE INVENTION

There are a number of different arrangements available today for transporting relatively light two-wheel vehicles. However, these arrangements often involve devices that are used on small motor vehicles such as automobiles, and not on larger, more comfortable motor vehicles such as recreational vehicles.

Owners of mopeds, motorbikes and motorcycles wishing to transport such two wheel vehicles from place to place, rather than riding them, have various alternatives available to them. Trailers, for example, may be used to carry up to three motorcycles. Another common means is the use of a van or pickup truck. Still other alternatives include the use of attachments to or replacement of the bumper by a carrier device. None of the above-listed means for transporting these two wheel vehicles is totally acceptable, however.

Trailers are expensive, sometimes costing as much as the motorcycle to be carried. When not in use, trailers must be stored, are difficult to back up and park, and also require other expenses in maintenance, spare tires, license and tolls.

Hoop-type carriers that attach to the bumper must be put on prior to use and be removed after use, or, if kept in place, are unsightly and run the distinct risk of being ruined by even the slightest bumper to bumper collision. The hoop-type carriers are also restricted to the size of the two wheel vehicle that can be carried.

Replacement of a conventional vehicle bumper with a channel carrier common to some trailers likewise offers an unsightly appearance and is susceptible to destruction by moderate impact, such as may be involved in a minor collision.

Structures of this general type have in the past normally been clamped, bolted or otherwise affixed to the bumper of the vehicle and have had limitations of weakness, insecurity and difficulty of mounting to the bumper. Further, the bumpers of many modern automobiles are of reduced size and close tolerance, particularly at their upper edges, which makes it difficult to obtain a satisfactory mounting of a carrier structure or trailer hitch thereon.

An outstanding disadvantage of conventional carriers for two wheel vehicles presently in use is that they usually require special attachments and hitches for securing them to the rear of a vehicle. This adds considerably to the cost and also requires the welding or bolting of parts of the carrier to the rear of the vehicle, which mars the vehicle and/or adds substantial expense.

Another disadvantage of presently used carriers is that they involve considerable manual labor each time they are to be installed on the rear of a motor vehicle, and require special means for rigidly holding the two wheel vehicle in place.

Still another disadvantage is the fact that the rear bumper on some motor vehicles of recent vintage is recessed or otherwise constructed as to be very difficult to work with, and in addition, often are of such insubstantial construction as to be unable to bear the weight of certain two wheel vehicles.

As will be seen hereinafter in considerable detail, the present invention suffers from none of the above disadvantages. The instant invention is inexpensive, compact, and does not interfere with parking or backing up of the vehicle of which it is an integral part. Most advantageously, one embodiment of my invention may be regarded as a dual mode device, which can be utilized in either a carrier mode or in a trailer pulling mode, with the conversion from one mode to another being readily accomplished by moving an appropriately configured folding component from one position to another.

SUMMARY OF THE INVENTION

This invention relates to improved novel carrier means for attachment to a conventional undercar receiver mounted on the chassis of a motor vehicle at a location below the rear bumper of the motor vehicle. My novel carrier can be used with a wide range of motor vehicles, including but not limited to small automobiles, vans, campers, motor homes, and the like, with this carrier able to be readily utilized as a trailer hitch without necessitating the use of any tools.

The present novel carrier is so designed that it may be attached readily and rapidly to the undercar receiver bolted or otherwise secured to the chassis of the vehicle, and may as readily be later removed therefrom. When used as a carrier, the instant invention can readily support a motor bike, moped, light motorcycle or other such two wheel vehicle in a highly satisfactory manner.

It is therefore a primary object of this invention to provide a compact, highly advantageous and readily affordable carrier device for small two wheel vehicles, which may be rapidly and easily affixed to a conventional undercar receiver at the rear of a motor vehicle, and which may thereafter be readily utilized, without necessitating the use of any tools, for towing a trailer.

It is another object of this invention to provide a compact, highly advantageous and readily affordable carrier device for small two wheel vehicles, which may normally be maintained in a compact condition in which it occupies a minimal amount of space on the back of the motor vehicle, but which can be readily deployed in an configuration in which it is ready to safely support and transport a two wheel vehicle.

It is still another object of the present invention to provide a novel carrier for transporting a two wheel vehicle such as a motorbike, motor scooter, or relatively small motorcycle on the rear of a motor vehicle, which carrier can readily be converted from a folded, unobtrusive and compact position into a configuration for receiving the two wheel vehicle, with this carrier thereafter being able to be returned to the folded position without necessitating the use of tools of any kind.

It is yet another object of this invention to provide a highly advantageous carrier device for small two wheel vehicles which may be rapidly and easily affixed to the undercar receiver at the rear of a motor vehicle without requiring any specialized tools, which carrier is of superior strength yet of economical construction, and which is capable of supporting relatively heavy loads without applying any stress to the bumper of the motor vehicle.

It is yet still another object of the present invention to provide a novel carrier for two wheel vehicles, that can be easily and quickly mounted on a conventional, single connection type undercar receiver, as found in a great number of motor vehicles such as station wagons, tractors, campers, trucks and the like, with one embodiment of this carrier automatically presenting a towing ball when moving out of its vehicle-carrying position, into its folded position.

It is yet still another object of this invention to provide a novel carrier for two wheel vehicles, that can be easily and quickly mounted on a conventional, single connection type undercar receiver mounted on a recreational vehicle, with a second embodiment of my carrier presenting a towing ball in an active position at all times, such that the owner of the recreational vehicle, for example, can simultaneously carry a two wheel vehicle as well as towing a trailer.

These and other objects, features and advantages of this invention will become more apparent as the description proceeds.

DETAILED DESCRIPTION

Figure 1:
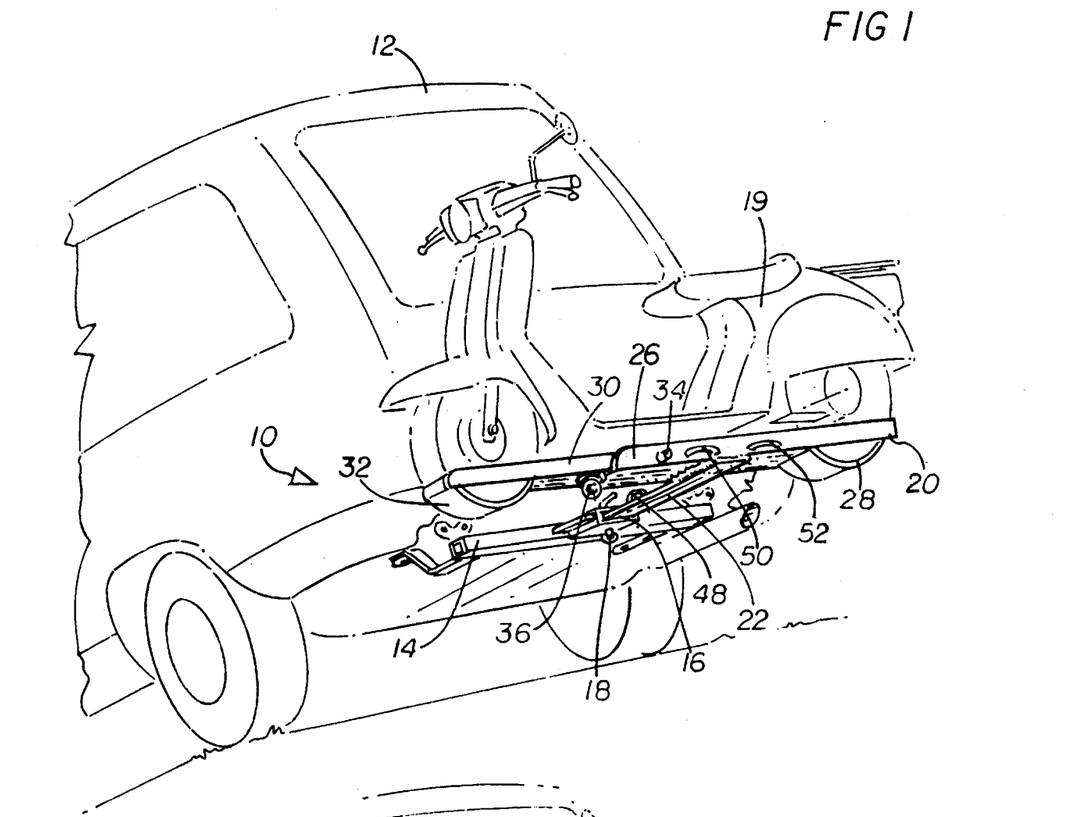
FIG. 1 is a perspective view of the underside of a typical motor vehicle with which my invention may be utilized, with this view showing an undercar receiver of the type that may be utilized to removably support my novel carrier.

With initial reference to FIG. 1 it will be seen that I have shown my novel dual mode carrier 10 mounted on the rear end of a motor vehicle 12. Although the illustrated motor vehicle is a relatively small, passenger-carrying vehicle, it is to be understood that my invention may be utilized in connection with a larger vehicle, such as a station wagon, van, motor home, recreational vehicle or the like.

FIG. 1 is a perspective view representing a portion of the rear underside of the motor vehicle 12, with this view illustrating that a sturdy trailer hitch mounting bar 14 of conventional construction has been mounted in a very secure manner to the chassis at the rear of the vehicle. The device 14 may also be referred to as an undercar receiver, and it is to be noted that this device is separate from, and not attached to, the rear bumper of the motor vehicle 12. It is thus not necessary for the motor vehicle to be utilized in conjunction with my invention to be equipped with a load carrying bumper. This is true because the sole support for my novel dual mode carrier 10 depicted in FIG. 1 is derived from the trailer hitch mounting bar or undercar receiver 14 that is mounted, as previously mentioned, to a rear portion of the chassis of the vehicle.

Located in a central rear portion of the mounting bar or undercar receiver 14 is a slot 16, which is provided by the manufacturer in order to receive the conventional sturdy flat steel member upon which a towing ball (trailer hitch ball) has been installed. In the present instance, however, I utilize the slot 16 in the conventional undercar receiver for receiving a forwardly extending portion of my novel dual mode carrier 10, to be described shortly. A vertically disposed hole is conventionally located in a mid portion of the slot 16, which hole is provided in a 90° relationship to the slot 16, with the manufacturer intending for a sturdy metal pin 18 of the type shown in FIG. 7a to be utilized for securing in the undercar receiver 14, the sturdy flat member upon which the towing ball of a trailer hitch has been mounted. As will be seen hereinafter, I use this arrangement for removably securing my novel dual mode carrier in an operative position to the undercar receiver 14.

It is to be understood that in FIG. 1, a motorscooter 19 is shown being supported by a first embodiment of my novel dual mode carrier 10, with it to be understood that my novel carrier is not limited to carrying a motorscooter, for it may be configured to carry a moped, motorbike, relatively light motorcycle or certain other types of two wheel vehicles. Certain constructional details of this first embodiment of my novel dual mode carrier 10 will be apparent from a study of FIGS. 3a and 3b, whereas in FIGS. 4a and 4b, I show relevant constructional details of a second embodiment of my novel carrier, which second embodiment can at all times be used for towing a trailer. This latter embodiment will be described in further detail hereinafter.

Figure 2:
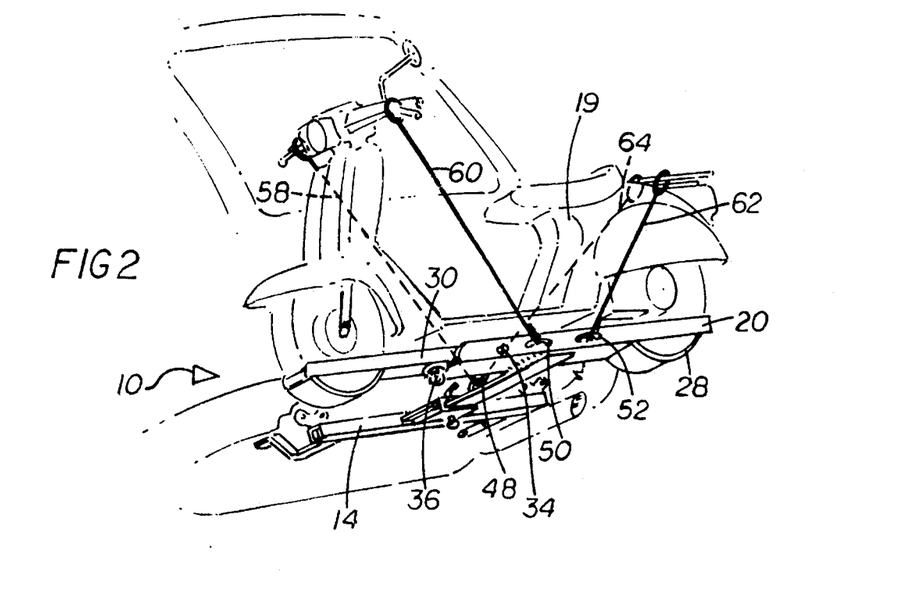
FIG. 2 is a perspective view closely resembling FIG. 1, with this view being principally being concerned with illustrating how a plurality of straps, attached to my novel carrier, can be utilized for holding the two wheel vehicle in a safe position on the rear of a motor vehicle.

By now it should be clear that by the use of my novel carrier device, it is not necessary for the motor vehicle to be equipped with a load carrying bumper inasmuch as the sole support for both embodiments of my novel dual mode carrier is derived from the trailer hitch mounting bar (undercar receiver) 14 that is mounted, as previously mentioned, to a rear underside portion of the chassis of the vehicle. As hereinafter mentioned, I may use approximately tour straps for stabilizing the two wheel vehicle in a desired carrying position, as shown in FIG. 2.

Figure 3A:
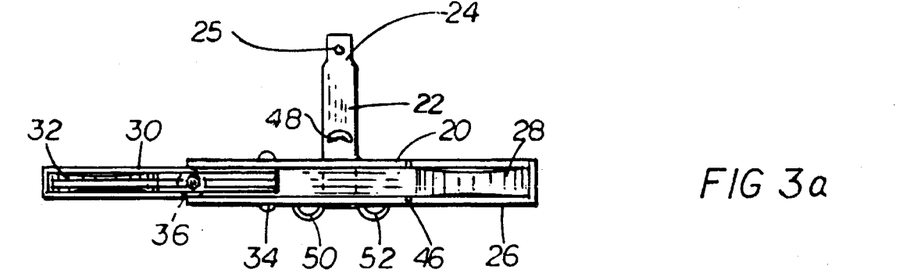
FIG. 3a is a top view of a first embodiment of my novel carrier, shown here in its extended position, in which position it may receive a two wheel vehicle to be transported.
Figure 3B:
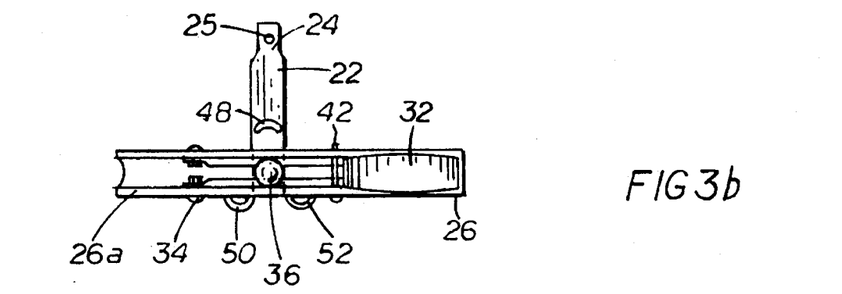
FIG. 3b is a view similar to FIG. 3a, but here showing this first embodiment of my novel carrier in its folded position, in which a towing ball suitable for towing a trailer is automatically presented.

It is the first embodiment of my novel carrier 10 that is depicted in FIG. 1, with the carrier 10 being in its extended position suitable for supporting and transporting a two wheel vehicle of the previously described type. Part of the carrier 10 I prefer to regard as the rigid portion 20, which consists of the forwardly extending member 22, and the sturdy laterally extending member 26. I may also refer to the rigid portion 20 as the base member, which is of "L" shaped configuration. These details are best seen in FIGS. 3a and 3b.

It is to be noted that the sturdy forwardly extending member 22, which forms the means for removably attaching the carrier 10 to the conventional undercar receiver 14, has a tongue-shaped portion 24 designed to be inserted into the previously mentioned slot 16 of the undercar receiver. The tongue-shaped portion 24 is provided with a hole 25 into which the pin 18 mentioned in conjunction with the trailer hitch mounting bar 14 may extend in order to hold the forwardly extending member 22 in a fixed relationship to the undercar receiver or mounting bar 14.

Disposed in a right angle relationship to the forwardly extending member 22 is the previously mentioned laterally extending structural member 26, which forms with the member 22, as previously mentioned, the L-shaped base member 20 of rigid, sturdy construction. From FIGS. 3a and 3b, as well as from FIGS. 4a and 4b, it will be seen that this L-shaped base member 20 is common to both embodiments of my invention, and the member 26 may for example be constructed of a steel channel member, although I am not limited to this. A wheel well 28, also referred to as a first supporting portion, is formed near the right hand edge of the structural member 26, as will be noted in FIGS. 1, 3a and 4a, and it is in this wheel well that the rear wheel of the two wheel vehicle 19 will be typically disposed. This arrangement involving the rear wheel of the two wheel vehicle being supported by the base portion 20 is preferred because the engine of the two wheel vehicle 19 is usually closer to the rear wheel than to the front wheel of motorscooters, mopeds and other two wheel vehicles that will often be transported on my novel carrier 10, and the sturdy base portion 20 is particularly well suited for carrying the weight associated with the engine portion of the two wheel vehicle.

With reference now to FIG. 2, it will be seen that in this instance that I have shown certain preferred securing strap arrangements in some detail, with the several straps being utilized to assure that the motor scooter or other two wheeled vehicle is maintained in a secure relationship on the back of the motor vehicle. I am not to be limited to any particular strap construction, but in many instances the straps may be of nylon and equipped with a hook or loop at each end. Typically the straps are of adjustable length.

Digressing for the moment to FIGS. 3a and 3b, it will be noted in these two closely related figures that on the forwardly extending member 22 I have provided a strap ring 48, to be utilized for receiving one end of a strap 58, as indicated in FIG. 2. The strap 58 is utilized for securing and stabilizing the front inside portion of the motor scooter 19. The strap ring 48 may also be utilized for receiving one end of the strap 64 utilized for stabilizing the rear inside portion of the two wheel vehicle 19.

It will be seen from FIGS. 3a and 3b that disposed on the rear of the laterally extending member 26 are a pair of rings 50 and 52, also known as safety chain rings. The ring 50 is to be utilized in conjunction with the front outside tie down strap 60, whereas ring 52 is to be utilized for receiving the rear outside tie down strap 62, with both of these straps being clearly visible in FIG. 2. I may also utilize a rear inside tie down strap that is firmly attached to the motor vehicle.

Figure 4A:
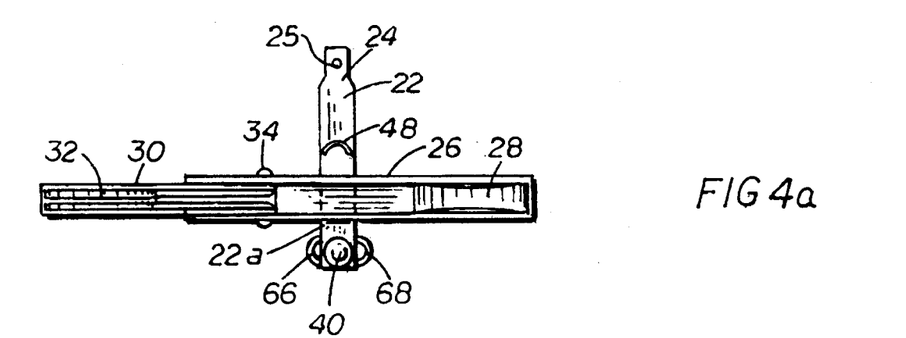
FIG. 4a is a top view of a second embodiment of my novel carrier, shown here in its extended position, in which position it may receive a two wheel vehicle to be transported as well as being able, at the same time, to pull a trailer.
Figure 4B:
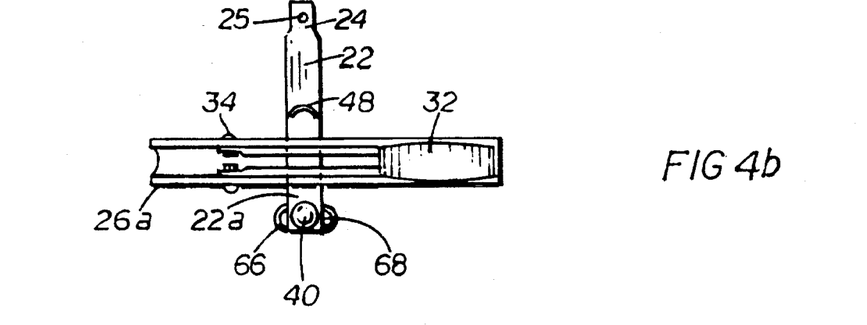
FIG. 4b is a view similar to FIG. 4a but here showing this second embodiment of my novel carrier in its folded position.

With momentary reference to FIGS. 4a and 4b associated with the second embodiment of my invention, it will be noted that I also use the strap ring 48 on the forwardly extending member 22 of this embodiment, but with regard to the rearwardly extending member 22a distinctive of this embodiment, it will be noted that I utilize sturdy safety chain rings 66 and 68, that may be made of either separate or substantially combined components.

Returning now to FIG. 3a, the first embodiment of my novel carrier 10 is shown in its extended position suitable for supporting and transporting a two wheel vehicle of one of the previously described types, with this figure revealing the previously mentioned base member 20 made up of the forwardly extending rigid portion 22 and the laterally extending member 26.

Figure 5:
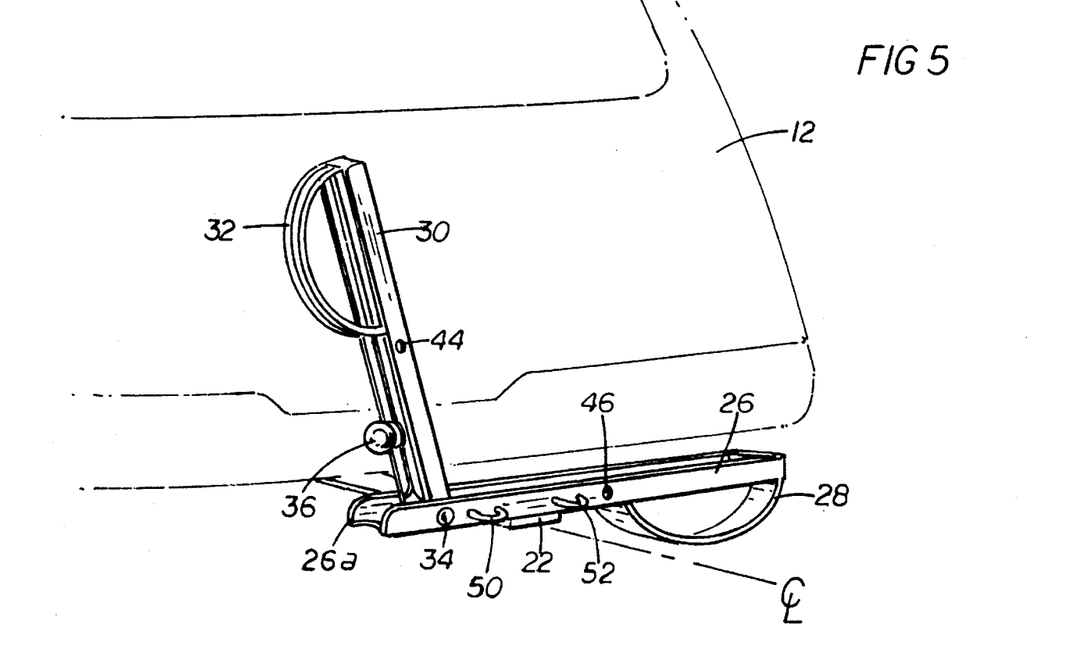
FIG. 5 is a view showing the movable portion of the first embodiment of my novel carrier in a position approximately midway between the extended configuration suitable for transporting a two wheel vehicle, and the folded or compacted position in which it could be used for towing a trailer.
Figure 6:
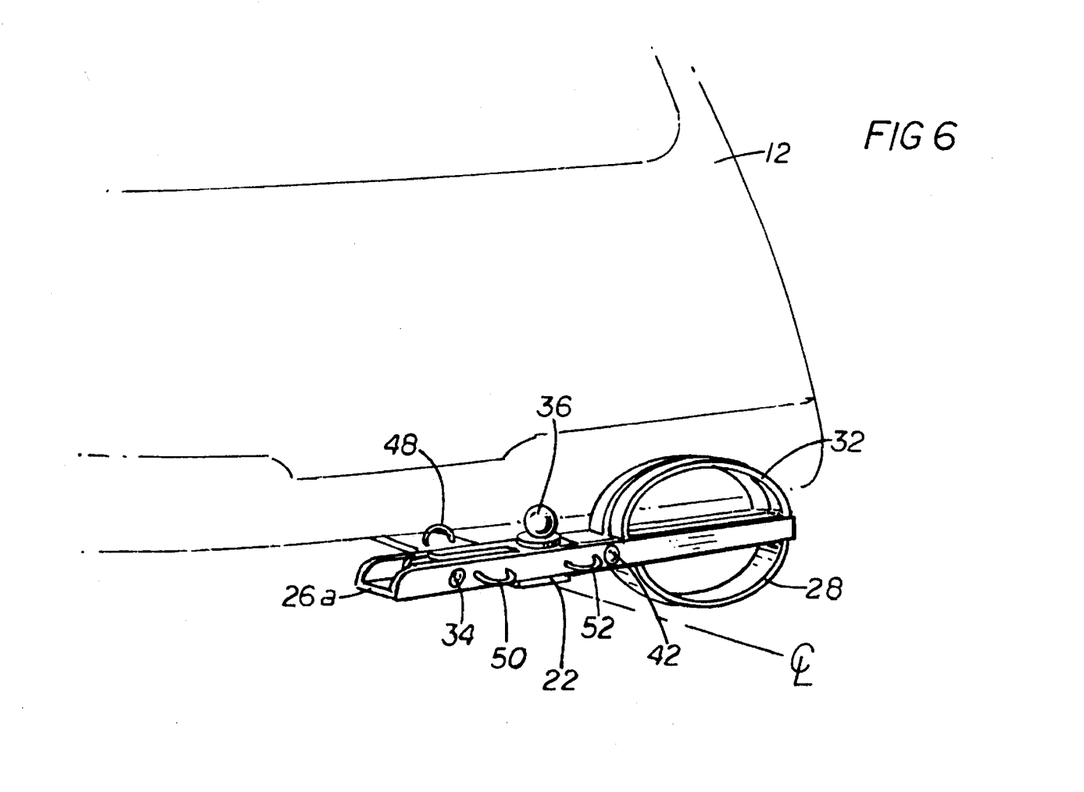
FIG. 6 is a view showing the movable portion of the first embodiment of my novel carrier in the storage position, which is a position in which the towing ball to be used for towing a trailer is presented on the centerline of the motor vehicle.

Pivotally attached to the rigid portion (base member) 20 is the other principal portion of my novel carrier, which is the folding portion 30, also referred to hereinafter as the second member. As will be seen hereinafter, this latter member or portion is common to both embodiments of my invention. The folding portion 30 is of sturdy construction, made for example of a steel channel member configured to have a wheel well 32. The wheel well 32 may also be referred to as the second supporting portion. The folding portion 30 is secured by a pin 34 to the laterally extending member 26 of the rigid portion 20, and it is important to note that the pin 34 is located some distance away from the left hand end of the rigid portion 20, as will be noted from FIG. 3b. I use this arrangement because I employ the projecting portion 26a of the structural member 26 for pivotally supporting the folding portion (second member) 30 in a secure, weight-carrying manner when the folding portion has been extended. As illustrated in FIG. 5, the second member 30 may be readily moved from the extended, generally horizontally disposed position shown in FIG. 3a, past the vertical and into the folded position shown in FIGS. 3b and 6.

Although in some embodiments not rigorously true, I prefer to describe my novel carrier as being foldable about its mid portion in order to accomplish a significant reduction in size of the carrier, such that it can remain in place for protracted periods of time in a compact, unobtrusive manner adjacent the rear bumper of the motor vehicle. In other words, the pin 34 securing the member 30 to the laterally extending member 26 is located relatively close to the forwardly extending member 22, which is to be disposed on the centerline of the towing vehicle.

A towing ball or trailer ball 36 is secured to the folding portion 30 of this first embodiment of my invention, as will be clearly noted from an inspection of FIGS. 1, 3a and 3b. Quite advantageously, when the folding portion 30 has been moved to the position shown in FIGS. 3b and 6, the towing ball 36 is moved into its functional, upright position, so as to enable the tongue or a trailer to readily engage same. It is significant to note that the towing ball 36 is disposed at a location essentially coinciding with the centerline of the forwardly extending member 22. Therefore, when pulling a trailer, the pull will originate on the centerline of the motor vehicle, such that there will be no undesirable lateral component.

It is to be noted that when this first embodiment of my novel carrier has moved approximately 180° away from its vehicle-transporting mode depicted in FIG. 3a, and into the folded or compacted position illustrated in FIG. 3b, the towing ball 36 is automatically presented in its active or operational position in which it may readily receive the tongue of a trailer. When in the active position, the towing ball is in substantial alignment with the centerline passing through the sturdy, forwardly-extending member 22.

It is obviously not desired for the foldable portion 30 to rise up, away from the base portion 20 when a trailer is being towed, so I find it desirable for a securing means such as a pin 42 to be inserted into hole 44 in the member 30 when it moves into proper alignment with the hole 46 located in member 26. When the pin 42 is in place, the folding member 30 is in effected locked into an integral relationship with the laterally extending member 26, so as to place my novel carrier in an entirely suitable compacted condition or mode for pulling a trailer in a highly satisfactory manner.

Turning now for a more detailed consideration of FIGS. 4a and 4b, I reveal in these figures what may be regarded as a secondary embodiment of the towing ball aspect of my invention. In this embodiment a component 22a of the member 22 extends rearwardly, behind the location of the laterally extending member 26, with this rearwardly extending member 22a being rigidly attached to the laterally extending member 26, and forming a sturdy support for the towing ball 40. As will be obvious, the position of the towing ball 40 is not changed when the folding member 30 (second member) moves away from the extended position revealed in FIG. 4a, and into the compacted position revealed in FIG. 4b.

it will be recalled I earlier mentioned that as depicted in FIGS. 4a and 4b, I utilize a pair of safety chain rings 66 and 68 that are rigidly attached to the rear end of the rearwardly extending member 22a, so that these safety chain rings can form the lower anchor means for a pair of the straps utilized for assisting other straps in holding the motorscooter in a secure position for transport.

As should be apparent, the embodiment of this invention depicted in FIGS. 4a and 4b is quite advantageous in that the towing ball 40 is at all times available to receive and support the tongue of a trailer, and whether or not a two wheel vehicle is being supported upon my novel carrier does not affect the capability of this embodiment of my device to tow a trailer.

The wheel wells or wheel-receiving locations 28 and 32 depicted in FIGS. 3a and 3b, as well as in FIGS. 4a and 4b, are to be sized so as to be compatible with the diameter of the wheels of the two wheel vehicle being supported on the novel carrier 10. In addition, the wheel wells are intended to be located a distance apart that is appropriate for the effective length of the two wheel vehicle being transported.

As should now be apparent, my novel carrier 10 for a two wheel vehicle is readily adapted for mounting on the rear end of a motor vehicle and the first embodiment of my invention may be regarded as having two modes of operation or two operative positions. One of these configurations or positions is of course the extended position shown in FIGS. 1 and 3a, and the other configuration or position is the folded or compacted position shown in FIGS. 3b and 6.

As should now be obvious, the second member 30 is readily movable from a compacted or folded position in which the wheel-contacting portions (supporting portions) are relatively close together, into an extended position, in which the wheel-contacting portions 28 and 32 are relatively widely separated. When in the latter configuration, my novel dual mode carrier can receive the wheels of a two wheel vehicle substantially simultaneously.

Figures 7A, 7B, 8:
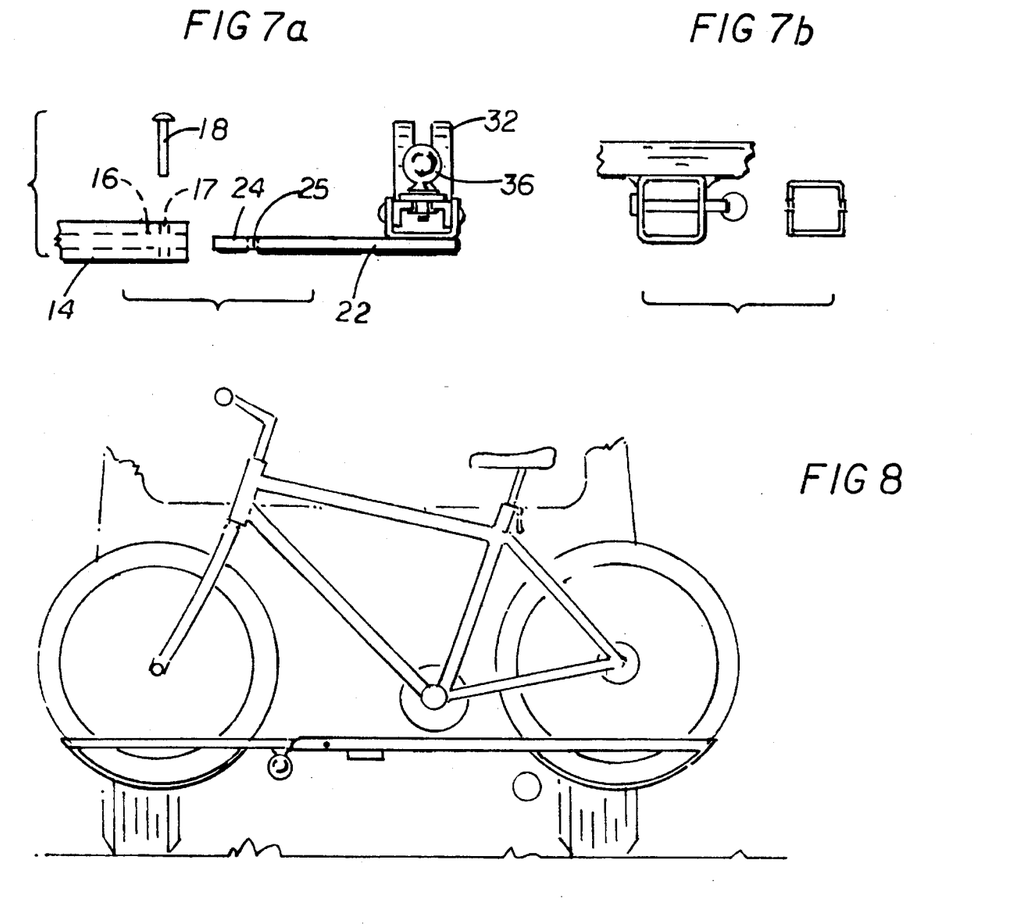
FIG. 7a is a side view of my novel carrier, showing the configuration involved when my device is used with one type of a Class I hitch.
FIG. 7b is a view of the type of arrangement used when one type or a Class II hitch is involved.
FIG. 8 is a view showing how a bicycle or a motorbike may be transported utilizing my novel carrier.

In accordance with one embodiment pertaining to the folding portion of my novel carrier device, the previously described hinge pin 34 may be regarded as permanently installed, meaning that the sturdy folding member 30 has in effect become an integral part of the laterally extending structural member 26. On the other hand, in accordance with another aspect or embodiment of my invention, a threaded bolt equipped with a suitable nut may be utilized at the hinge connection of the folding portion 30 to the laterally extending structural member 26, to enable one size of the folding portion 30 to be replaced with another. Such a replacement would of course be occasioned by changing from a condition in which one size two wheel vehicle is to be replaced with a two wheel vehicle whose wheels are either further apart or closer together.

in FIG. 7a I reveal to a larger scale, some of the details of a typical arrangement in which the forwardly extending portion 22 of my novel dual mode carrier is to be inserted into an operative relationship with the undercar receiver or trailer hitch mounting bar 14. In the illustrated instance, the undercar receiver is of the Class I type, which is appropriate for use with towing weights up to 2000 pounds, but it is quite obvious that I am not to be limited to this.

it is to be noted that the tongue-shaped portion 24 of the carrier 10 is to be inserted into the previously mentioned slot 16 located in a central portion of the undercar receiver 14, with the hole 25 in the tongue-shaped portion 24 coming into substantial alignment with a vertically disposed hole 17 located in the receiver 14. This of course permits the insertion of the sturdy metal pin 18 that will serve to hold the dual mode carrier 10 into an effective, fully operative relationship with the motor vehicle 12.

in FIG. 7b I illustrate an alternative arrangement in which my novel carrier 10 may be utilized with a Class II hitch, which is appropriate for towing weights up to 3500 pounds. It is obvious that the forwardly extending member used on the various embodiments of my carrier may be of either flat or square configuration.

Turning now to FIG. 8, it will be noted that I have illustrated an adaptation of my novel dual mode carrier when it is desired to carry a bicycle or motorbike. As is obvious, the wheel wells or wheel-receiving portions of the carrier depicted in FIG. 8 must be of larger diameter than corresponding portions used when it is desired to transport a motorscooter, for example. It is also likely that the folding portion or second member 30 will need to be changed should the user desire to switch from carrying a motorscooter, to carrying a bicycle or motorbike, in view of the likely differences in wheel spacings.

Figure 9:
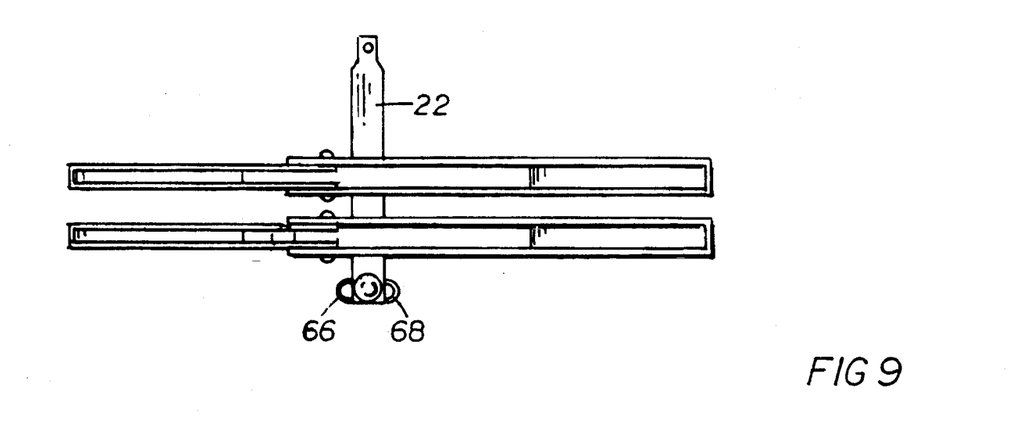
FIG. 9 is a view revealing that two bicycles or motorbikes may be carried in one particular embodiment of my novel carrier.

In FIG. 9 it will be noted that an embodiment of my carrier utilized for transporting bicycles or motorbikes may be configured to carry a pair of such two wheeled vehicles. It will be seen in FIG. 9 that the sturdy, rearwardly extending portion 22a is utilized in this embodiment in order to make it possible to tow a trailer at the same time as bicycles are being transported.

It should now be apparent that I have provided a readily affordable carrier for the transport of a wide variety of two wheeled vehicles, which carrier can be easily and quickly mounted on a conventional, single connection type undercar receiver, as found to be mounted on the underside of a number of motor vehicles such as station wagons, tractors, campers, trucks, recreational vehicles and the like. My novel carrier, when in its compacted configuration, automatically presents a towing hitch or ball for towing a trailer, but it is easily movable into a vehicle-carrying position in which it can safely and effectively carry motorscooters, motorbikes, and many other types of two wheel vehicles.

I claim:

1. A carrier for a two wheel vehicle adapted for mounting on a rear end of a motor vehicle having a frame as well as a rear bumper, said carrier having a rigid base member provided with a first supporting portion, a second member pivotally attached to said base member and movable for a limited extent with respect thereto, said second member being of rigid construction and being provided with a second supporting portion, said second member being movable from a compact, folded position in which said first and second supporting portions are disposed relatively close together, into an extended position in which said supporting portions are relatively widely separated, such that said supporting portions can contact and support two relatively widely separated portions of the two wheeled vehicle, and means for removably attaching said carrier to an undercar receiver attached to the frame of a motor vehicle, at a location below and forward of the rear bumper of such motor vehicle, said means for removably attaching said carrier to the undercar receiver being a forwardly extending member rigidly attached to said base member, which forwardly extending member is intended to be received in a slot located in said undercar receiver.

2. The carrier for a two wheel vehicle as recited in claim 1 in which said base member is generally "L" shaped.

3. The carrier for a two wheel vehicle as recited in claim 1 in which a towing ball is disposed on said second member, said towing ball being in substantial alignment with a centerline passing through said forwardly extending member when said second member is in its folded position.

4. The carrier for a two wheel vehicle as recited in claim 1 in which a towing ball is attached to said second member, said towing ball being in an upright position to be engaged by a trailer at such time as said second member is in its folded position.

5. The carrier for a two wheel vehicle as recited in claim 1 in which a towing ball is rigidly mounted on said base member so as to be availed at all times for receiving the tongue of a trailer to be pulled.

6. A carrier for a two wheel vehicle adapted for mounting on a rear of a motor vehicle and having an extended position as well as a folded position, with said extended position being intended for carrying a two wheeled vehicle, and said folded position being one in which said carrier presents a compact configuration, said carrier utilizing a rigid base member having a wheel receiving portion, and a second rigid member pivotally attached to said base member, said second member also having a wheel receiving portion, said second member, when in said compact configuration, having its wheel receiving portion adjacent the wheel receiving portion of said base member, said second member, when moved to the extended position, having its wheel receiving portion removed for a relatively substantial distance from the wheel receiving portion of said base member, such that the wheels of a two wheel vehicle can be substantially simultaneously received in the wheel receiving portions of said base member and said second member, whereby the two wheeled vehicle is adapted to be transported by a motor vehicle to another location, and a towing ball operatively mounted on said carrier for enabling a trailer to be pulled.

7. The carrier for a two-wheel vehicle adapted for mounting on the rear end of a motor vehicle as recited in claim 6 in which said base member is generally "L" shaped.

8. The carrier for a two-wheel vehicle adapted for mounting on the rear end of a motor vehicle as recited in claim 6 in which said base member is provided with a forwardly extending member configured to be removably received in an undercar receiver attached to the frame of the motor vehicle, at a location below the rear bumper of the motor vehicle.

9. The carrier for a two-wheel vehicle adapted for mounting on the rear end of a motor vehicle as recited in claim 8 in which said towing ball is disposed in substantial alignment with a centerline passing through said forwardly extending member.

10. The carrier for a two wheel vehicle as recited in claim 6 in which said towing ball is rigidly mounted on a portion of said base member so as to be availed at all times for receiving the tongue of a trailer to be pulled.

11. The carrier for a two wheel vehicle as recited in claim 6 in which said towing ball is attached to said second member, said towing ball being in an upright position in which it is adapted to be engaged by the tongue of a trailer at such time as said second member is in its compact configuration.

12. A carrier for a two wheel vehicle adapted for mounting on a rear end of a motor vehicle, said carrier having a rigid base member provided with a wheel receiving portion, a rigid second member pivotally attached at approximately a mid portion of said base member, with said second member also provided with a wheel receiving portion, said second member being movable from a folded position in which said wheel receiving portions are disposed relatively close together, into an extended position in which said wheel receiving portions are relatively widely separated, such that the wheels of a two-wheeled vehicle are adapted to be received in said wheel receiving portions, said base member being provided with a rigid, forwardly extending member configured to be removably received in an undercar receiver attached to the frame of a motor vehicle, at a location below a rear bumper of such motor vehicle.

13. The carrier for a two wheel vehicle as recited in claim 12 in which said base member is generally "L" shaped.

14. The carrier for a two wheel vehicle adapted for mounting on the rear end of a motor vehicle as recited in claim 12 in which a towing ball is attached to said second member, said towing ball, when in an upright position, being disposed in substantial alignment with a centerline passing through said forwardly extending member.

15. The carrier for a two wheel vehicle as recited in claim 12 in which a towing ball is attached to said second member, said towing ball being in an upright position to be engaged by a trailer at such time as said second member is in said folded position.

16. The carrier for a two wheel vehicle as recited in claim 12 in which a towing ball is rigidly mounted on said base member so as to be availed at all times for receiving the tongue of a trailer to be pulled.

17. A carrier having two operative positions and adapted for mounting on a rear of a motor vehicle, with one position of said carrier being intended for carrying a two wheel vehicle, and the other being a compacted position in which a towing ball is presented in an operative position, thus to enable a trailer to be pulled, said carrier utilizing a rigid base member having a wheel receiving portion, and a second member, also having a wheel receiving portion, that is pivotally attached to said base member, said second member, when in the compacted position, having its wheel receiving position adjacent the wheel receiving portion of said base member, said second member, when moved to an extended position, having its wheel receiving portion removed for a relatively substantial distance from the wheel receiving position of said base member, such that the wheels of a two-wheeled vehicle are adapted to be simultaneously received in the wheel receiving portions of said base member and said second member.

18. The carrier having two operative positions and adapted for mounting on the rear end of a motor vehicle as recited in claim 17 in which said base member is generally "L" shaped.

19. The carrier having two operative positions and adapted for mounting on the rear end of a motor vehicle as recited in claim 17 in which said base member is provided with an extension member configured to be removably received in an undercar receiver attached to the frame of the motor vehicle, at a location below the rear bumper of the motor vehicle.

20. The carrier for a two-wheel vehicle adapted for mounting on the rear end of a motor vehicle as recited in claim 19 in which said towing ball is disposed on said second member, said towing ball in its operative position being in substantial alignment with a centerline passing through said extension member when said second member is in its compacted position.

21. The carrier for a two wheel vehicle as recited in claim 17 in which said towing ball is rigidly mounted on said base member so as to be availed at all times for receiving the tongue of a trailer to be pulled.

* * * * *